US012652304B2

(12) United States Patent
Arora et al.

(10) Patent No.: US 12,652,304 B2
(45) Date of Patent: Jun. 9, 2026

(54) SYSTEM AND METHOD FOR GENERATIVE DESIGN BASED REAL-TIME RESTRICTED SUB APPLICATION SETUP WITH NON-PRODUCTION DATA ARCHITECTURAL FLOW DETERMINATION WITH ENTERPRISE SCOPED LARGE LANGUAGE INJECTION MODEL

(71) Applicant: Bank of America Corporation, Charlotte, NC (US)

(72) Inventors: Saurabh Arora, New Palam Vihar (IN); Sandeep Kumar Chauhan, Miyapur (IN); Mallidi Bhagya Lakshmi Sudha Lavanya, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 53 days.

(21) Appl. No.: 18/674,018

(22) Filed: May 24, 2024

(65) Prior Publication Data

US 2025/0365299 A1 Nov. 27, 2025

(51) Int. Cl.
*H04L 9/40* (2022.01)
*G06F 40/20* (2020.01)

(52) U.S. Cl.
CPC .......... *H04L 63/1425* (2013.01); *G06F 40/20* (2020.01)

(58) Field of Classification Search
CPC . H04L 63/1425; H04L 63/1433; H04L 41/16; H04L 63/1408; H04L 63/1416;
(Continued)

(56) References Cited

U.S. PATENT DOCUMENTS 11,921,810 B2 3/2024 Peled
12,386,691 B1 * 8/2025 Jain .................... G06F 11/0709
(Continued)

FOREIGN PATENT DOCUMENTS

| | | | |
|---|---|---|---|
| CN | 117252265 | A | 12/2023 |
| KR | 102627813 | B1 | 1/2024 |
| TW | 202349325 | A | 12/2023 |

OTHER PUBLICATIONS

Yang et al., "An Anomaly Detection Model Training Method Based on LLM Knowledge Distillation," 2024 International Conference on Networking and Network Applications (NaNA) Year: 2024 | Conference Paper | Publisher: IEEE.*
(Continued)

*Primary Examiner* — Roderick Tolentino
(74) *Attorney, Agent, or Firm* — Banner & Witcoff, Ltd.

(57) ABSTRACT

Systems and processes enhance cybersecurity by dynamically generating a decoy sub-application that operates parallel to the primary application using generative design and a large language model. The core feature involves real-time anomaly detection within application traffic, utilizing AI to assess threats and orchestrate appropriate responses. Upon identifying potential security threats, the system employs generative design principles to architect a restricted-functionality sub-application, deploying it instantly to engage and analyze the attack vectors without compromising sensitive production data. The sub-application is isolated through software-defined networking, ensuring that its operations do not affect the primary application's functionality. Additionally, sophisticated traffic redirection mechanisms are employed to divert suspicious traffic from the primary to the decoy application, thereby protecting the integrity while allowing detailed threat analysis. This dual-capability system not only safeguards against disruptions but
(Continued)

also enhances adaptive security measures through continuous learning and system adjustments.

20 Claims, 6 Drawing Sheets

(58) Field of Classification Search
CPC ....... H04L 63/14; G06F 40/20; G06F 21/577; G06F 2221/034
See application file for complete search history.

(56) References Cited

U.S. PATENT DOCUMENTS

| | | | | |
|---|---|---|---|---|
| 2018/0139215 | A1* | 5/2018 | Neuvirth-Telem | G06F 21/577 |
| 2023/0208869 | A1 | 6/2023 | Bisht et al. | |
| 2023/0252224 | A1 | 8/2023 | Tran | |
| 2023/0297696 | A1 | 9/2023 | Rogers et al. | |
| 2023/0351105 | A1 | 11/2023 | Mammen | |
| 2023/0368321 | A1 | 11/2023 | Bringsjord et al. | |
| 2023/0396637 | A1 | 12/2023 | Hebbagodi et al. | |
| 2024/0020953 | A1 | 1/2024 | Park et al. | |
| 2024/0029901 | A1 | 1/2024 | Ezhov et al. | |
| 2024/0045990 | A1 | 2/2024 | Boyer et al. | |
| 2024/0054233 | A1 | 2/2024 | Ohayon et al. | |
| 2024/0062067 | A1 | 2/2024 | Hu et al. | |
| 2024/0071598 | A1 | 2/2024 | Neumann | |
| 2024/0078337 | A1 | 3/2024 | Kamyshenko et al. | |
| 2025/0061195 | A1* | 2/2025 | Salman | G06F 21/552 |
| 2025/0156535 | A1* | 5/2025 | Keller | G06F 21/566 |
| 2025/0168186 | A1* | 5/2025 | Mcdonald | H04L 63/1433 |
| 2025/0181679 | A1* | 6/2025 | Oz | G06F 21/121 |
| 2025/0225252 | A1* | 7/2025 | Kancham | G06F 21/577 |
| 2025/0240313 | A1* | 7/2025 | Zhang | H04L 41/16 |
| 2025/0245665 | A1* | 7/2025 | Tholar | G06Q 20/4016 |
| 2025/0310376 | A1* | 10/2025 | Strogov | H04L 63/1416 |

OTHER PUBLICATIONS

Sui et al., "Bridging the Gap: LLM-Powered Transfer Learning for Log Anomaly Detection in New Software Systems," 2025 IEEE 41st International Conference on Data Engineering (ICDE) Year: 2025 | Conference Paper | Publisher: IEEE.*

* cited by examiner

100. Implement Alternate Application Requirement Context Identification With LLM For Org Level Application Injection Knowledge And Software Defined Network Based Alternate Infra Cluster Setup For Identified MVP APIs/Microservices And Functional Flows 101. Application Servers That Are Serving Live Prod Traffic, To Have Anomaly Review Agents (For Irregular Patterns), And Will Raise Indicators If Circuit Breakers Are Being Triggered Regularly For Same APIs.

102. Injection Monitors On App Servers To Feed Injection Knowledge To LLM On Suspected Type, Irregular Traffic And Excessive API Load 104. Per Feeds From [Step 100 & 102], Decision Is Taken To Have Alternate Application Setup And Associated MVP Architecture Identification Is Triggered Accordingly 106. Generative Design Component (Per Feeds From LLM) Prepares Restricted Architecture That Helps Identify Required Dependent Modules For Accessed Functionalities 108. Design Screens For Identified Functionality With Restricted Features And Setup Proxy Data To Be Populated With Mentioned Capabilities 110. Network Requirements For Identify Functions Are Listed 112. Installable Package (With MVP APIs, Microservices) Gets Created Per Designed Sub Application Architecture 114. Software Defined Network Is Created Against Network Requirements From [Step 110] And Packages From [Step 112] Are Deployed 116. Marked Malicious Application Calls Would Be Routed To Newly Deployed Application That Will Have Restricted Functionality And Proxy Data That Would Keep The Attacker Busy And Would Not Expose Production Data 118. Build Models With Accurate Knowledge Patterns Of Attacks And To Facilitate Creation Of Resilient Applications

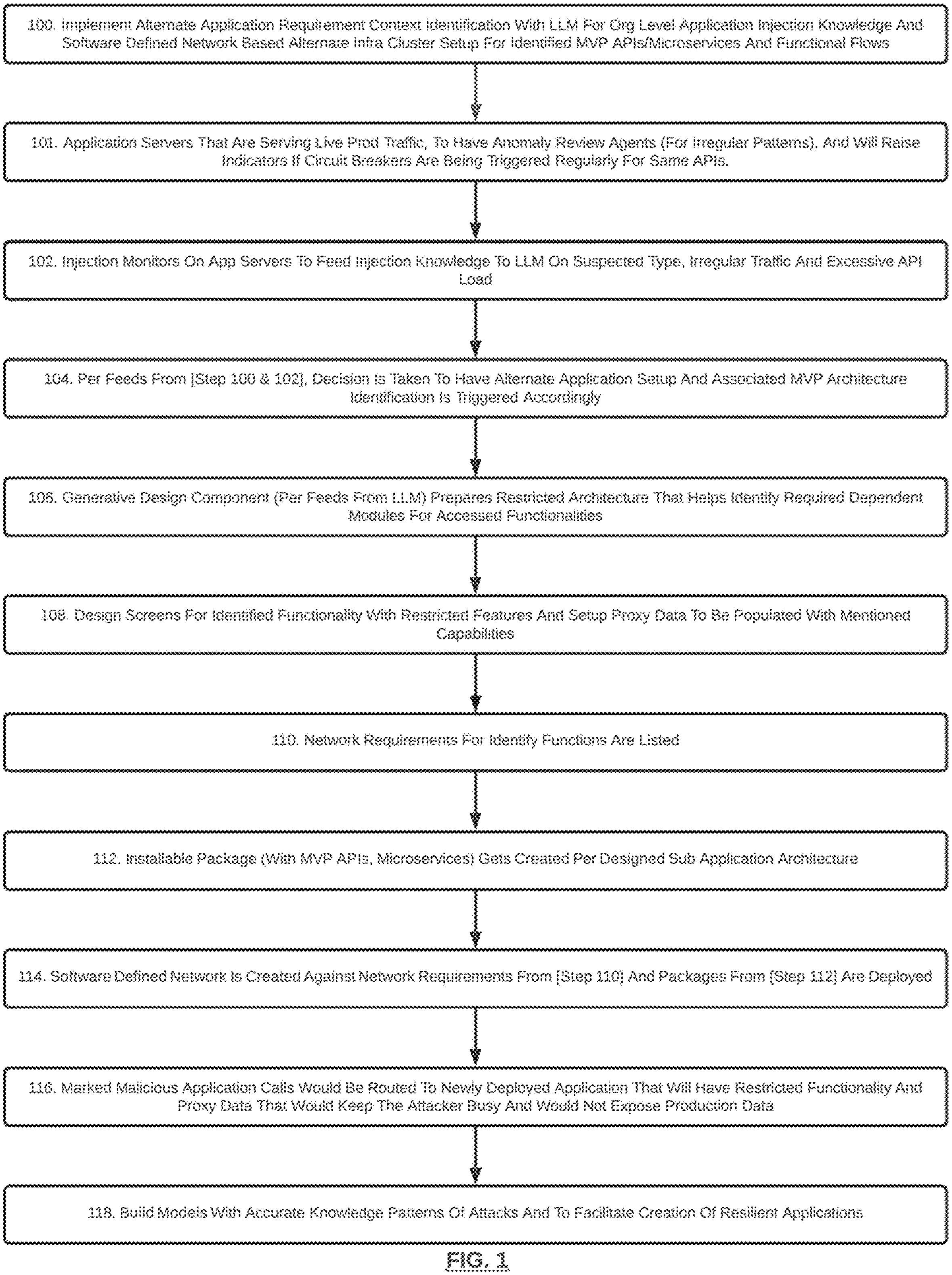

FIG. 1

SYSTEM AND METHOD FOR GENERATIVE DESIGN BASED REAL-TIME RESTRICTED SUB APPLICATION SETUP WITH NON-PRODUCTION DATA ARCHITECTURAL FLOW DETERMINATION WITH ENTERPRISE SCOPED LARGE LANGUAGE INJECTION MODEL

TECHNICAL FIELD

The present invention pertains to the field of Data Processing: Artificial Intelligence, specifically within the domain of data processing systems that enhance security protocols and operational efficiency in digital settings. This invention employs advanced artificial intelligence techniques to create and manage secure, real-time application architectures using principles of generative design and large language models. Central to the system's functionality is the use of artificial intelligence to examine, forecast, and address potential security risks via a parallel application configuration that utilizes non-production data. This configuration facilitates the continuous monitoring and addressing of security threats without detrimentally affecting the main application's performance, thus preserving both system integrity and user experience.

DESCRIPTION OF THE RELATED ART

In production environments where applications serve business functions, monitoring and mitigation are paramount to maintaining system integrity and performance. Traditional methods used in these environments typically include a combination of anomaly detection, circuit breakers, and load management techniques. These are designed to reduce traffic to failing components, thus isolating issues, and preventing a cascade of failures across the system. However, while these mechanisms are effective in managing symptoms of problems, they rarely address the underlying causes or the intent behind disruptive activities, particularly security threats like injection attacks.

Injection attacks, where malicious parties attempt to insert unauthorized commands or data into a system, pose significant challenges. Current response strategies generally involve activating circuit breakers that cut off traffic to affected components when anomalies or excessive loads are detected. This reactive approach helps in containing the damage but does so without providing insights into the attack. While the immediate threat may be mitigated, the lack of understanding about the attack vectors leaves systems vulnerable to future incidents.

Frequent activation of circuit breakers and similar mechanisms often results in repeated downtimes for applications. Although these downtimes may be brief, they interrupt the user experience and can diminish the application's performance. Over time, such disruptions can erode user trust and satisfaction, particularly for services that depend on continuous availability and consistent performance.

The primary tools for monitoring—circuit breakers and anomaly detection systems—are inherently limited in their scope. They focus on identifying and responding to symptoms of issues rather than exploring the causes. This limitation prevents IT teams from developing a deep understanding of the attack patterns and improving their defenses against them. The current systems effectively stop the problem temporarily but do not contribute knowledge that could prevent future problems.

Additionally, cutting off traffic to manage failing APIs or modules does not allow for any engagement with the attacker, which could provide valuable insights. By simply blocking or restricting traffic, current solutions miss the opportunity to analyze the attacker's methods and intentions. Understanding these could lead to more robust security measures, but the opportunity is lost with conventional methods.

The need to maintain operational continuity while managing security threats is another significant challenge. Often, the actions taken to secure the system against attacks, such as disabling certain functionalities or cutting off traffic, can themselves become a source of disruption. This creates a paradox where measures taken to protect the application can negatively affect its functionality, leading to a lose-lose situation where either security or performance is compromised.

In environments where data sensitivity is paramount, the risk of exposing production data during an attack is a relevant concern. Traditional methods that handle traffic redirection or system isolation rarely differentiate between benign and malicious requests efficiently, potentially exposing sensitive data during an attack. This exposure can have severe consequences, including data breaches and compliance violations.

There is also a significant gap in adaptive security measures that can dynamically respond to evolving threats. Most existing systems are configured to respond based on predefined rules and thresholds. They lack the capability to learn from ongoing attacks and adapt their defenses in real-time, which is relevant in handling sophisticated and evolving threats.

The lack of a proactive engagement strategy to handle potential security threats means that systems are always in a defensive mode, reacting to threats after they have been realized rather than preventing them. This approach is less efficient and can be more costly in terms of both resources and potential damage.

The invention addresses a long-felt and unmet need in the field of application security and performance management. There has been a consistent demand for a solution that not only effectively mitigates threats when they occur but also enhances understanding of attack patterns, minimizes downtime, and maintains user experience without compromising the operational integrity of the application. The need for a system that can dynamically generate protective measures in real-time while allowing detailed analysis and engagement with the attack patterns represents a significant advancement in how digital security is managed in relevant environments.

SUMMARY OF THE INVENTION

The present invention introduces a novel approach to enhancing cybersecurity in digital applications. This system utilizes a combination of generative design and artificial intelligence, specifically a large language model, to dynamically create a secondary, restricted-functionality application that operates in parallel to the primary application but with non-production data. This strategy is designed to mitigate potential security risks without interrupting the primary application's functionality.

The core of the invention lies in its ability to monitor the primary application for any signs of injection attacks or other irregular patterns that might indicate a security threat. Anomaly detection agents integrated within the application servers are responsible for this monitoring. These agents analyze traffic and interactions, looking for patterns that deviate from the norm, which could suggest potential security threats.

Upon detection of such anomalies, the system leverages a large language model to interpret the nature of the threat and to facilitate decision-making regarding the deployment of the secondary application. This AI-driven analysis allows the system to understand the context and specifics of the detected threat in real-time, enabling a tailored response to different types of security challenges.

The generative design component of the system then springs into action, utilizing the insights gained from the large language model to architect a secondary application. This sub-application is designed specifically to engage the potential threat without exposing any real or sensitive data. It mimics the functionality of the primary application to an extent necessary to deceive and engage the malicious entities, thereby protecting the integrity and security of the main application.

One aspect of the invention is the real-time deployment of this secondary application. Once the generative design process defines the architecture and required components of the sub-application, an automated process creates and deploys this decoy application onto a designated infrastructure isolated from the main operational environment. This ensures that any interaction with the decoy does not affect the primary application's performance or data integrity.

The system's deployment strategy includes setting up a software-defined network that facilitates the isolation and operation of the secondary application. This network is configured to handle the specific needs of the decoy environment, ensuring efficient operation without compromising the security or functionality of the primary network.

Traffic redirection mechanisms are another integral part of the invention. These mechanisms smartly redirect suspected malicious traffic from the primary application to the secondary application. This redirection is managed in such a way that attackers believe they are still interacting with the primary target, thus keeping them engaged without causing harm.

Throughout this process, the system can continuously monitor interactions with the secondary application to gather data on the attack strategies and tactics used by the attackers. This information is valuable for understanding threats faced and for refining security measures. The insights gained can be used to enhance the AI models and generative design parameters, making the system more adept at responding to future threats.

Additionally, the flexibility and scalability of the system are key features. It is designed to adapt to various application environments and can be scaled according to the size and complexity of the infrastructure it protects. This makes it suitable for a wide range of industries and applications, from small businesses to large enterprises.

This invention not only protects digital applications from potential threats through a novel use of decoy environments but also enhances the understanding of cybersecurity threats in real-time. By doing so, it provides a robust tool for digital security management, significantly reducing the risk of data breaches and system downtime due to attacks, while ensuring that the primary application's performance remains unaffected. This dual capability of protection and performance management sets this system apart in cybersecurity solutions.

In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

In some arrangements, the invention offers several features that substantially enhance cybersecurity for digital applications by providing a robust and dynamic response to potential security threats. These features are intricately designed not only to mitigate immediate threats but also to refine ongoing security strategies, ensuring a harmonious balance between operational integrity and optimal user experience.

One is its advanced early anomaly detection and management capability, which identifies and manages potential security threats in real-time. Unlike traditional systems that might respond to threats by halting traffic and potentially disrupting service, this system maintains continuous traffic flow to the primary application. This approach ensures that normal operations are uninterrupted while still addressing security concerns promptly, providing a seamless experience for users without sacrificing security.

Another aspect of the invention is its use of dynamic generative design for adaptive responses. The system includes a generative design component that actively designs and tailors a sub-application architecture specifically configured to address and neutralize detected threats. By dynamically generating a bespoke response based on the specific characteristics of each threat, the system can deploy precise solutions that are both effective and efficient.

To safeguard the primary application from potential harm or interference, the system employs isolated deployment of decoy applications. This strategic separation ensures that any interactions within the decoy environment, including engagements with potential threats, do not impact the functionality or security of the primary application. This isolation is relevant for maintaining the integrity and performance of the main application while still engaging threats in a controlled and secure manner.

One aspect of the system is its capability for enhanced threat analysis and continuous learning. By continuously monitoring the interactions within the decoy application, the system gathers detailed data on the tactics and strategies employed by attackers. This intelligence is invaluable not only for understanding current threats but also for enhancing the system's predictive capabilities and refining its response strategies for future threats.

This innovative system not only proactively mitigates threats as they arise but also significantly deepens the understanding of attack patterns. This enhanced insight allows for continuous improvement of security measures, ensuring the system remains effective against evolving threats and supports a high level of operational integrity while maintaining a superior user experience by preemptively addressing security issues without disrupting ongoing application performance.

In some arrangements, a method is disclosed for enhancing cybersecurity in digital applications. The method includes monitoring traffic and user interactions within a primary application by anomaly review agents deployed on application servers. This monitoring is aimed at detecting potential security threats. The method further involves analyzing the detected traffic and interactions using a large language model integrated with the anomaly review agents. This analysis helps identify patterns indicative of security threats and assesses the nature and severity of these threats.

Following the analysis, the method includes generating a real-time architectural plan for a restricted-functionality sub-application. This plan is developed by a generative design component based on the analysis performed by the large language model. The sub-application is specifically configured to engage with the detected threats without accessing production data, ensuring that sensitive information remains secure.

The restricted-functionality sub-application is then deployed on a separate infrastructure, isolated from the primary application using software-defined networking. This isolation ensures that interactions within the sub-application do not impact the operations of the primary application. Additionally, traffic suspected of being malicious is redirected from the primary application to the sub-application by traffic redirection mechanisms. This redirection not only protects the integrity of the primary application but also engages the potential security threats within the controlled environment of the sub-application.

Finally, the method includes continuously monitoring interactions within the sub-application to collect data on the attack strategies employed by malicious entities. This data is utilized to enhance the threat detection capabilities of the large language model, further refining the system's ability to respond to and mitigate future security threats effectively.

In some arrangements, a method is provided for enhancing cybersecurity in digital applications. This method includes deploying anomaly review agents on application servers. The anomaly review agents are configured to monitor network traffic and user interactions within a primary application to detect potential security threats. A large language model is integrated with the anomaly review agents to analyze the detected traffic and user interactions and identify complex patterns indicative of security threats. The nature and severity of these threats are assessed. A generative design component generates a real-time architectural plan for a restricted-functionality sub-application based on the analysis performed by the large language model. This sub-application is configured to engage with detected threats through interaction simulations without accessing or compromising any production data. The restricted-functionality sub-application is deployed on a separate infrastructure, isolated from the primary application using advanced software-defined networking techniques. This ensures that interactions within the sub-application do not impact the primary application's operations or data integrity. Traffic redirection mechanisms are employed to intelligently redirect traffic suspected of being malicious from the primary application to the sub-application. This redirection protects the integrity of the primary application and engages potential security threats within a controlled environment. Continuous monitoring of interactions within the sub-application is conducted using sophisticated data collection tools. These tools gather detailed data on the strategies and behaviors of malicious entities, and this data is analyzed to enhance the threat detection and response capabilities of the large language model.

In some arrangements, the method further includes initializing the large language model with historical security data before analyzing the detected traffic and user interactions. This initialization improves the accuracy of threat detection.

In some arrangements, the generative design component is configured to customize the operational parameters and security features of the restricted-functionality sub-application based on the specific detected threats. This customization dynamically alters the parameters to better engage with and neutralize the threats.

In some arrangements, deploying the restricted-functionality sub-application includes configuring network settings specific to the needs of the sub-application. These settings optimize network performance and security based on the expected interactions.

In some arrangements, the method includes updating firewall rules based on the data collected from monitoring interactions within the sub-application. This update prevents similar future attacks on the primary application.

In some arrangements, the traffic redirection mechanisms are configured to selectively redirect only those parts of traffic that exhibit patterns associated with previously identified threats. This selective redirection enhances the efficiency of traffic management and threat mitigation.

In some arrangements, the restricted-functionality sub-application is configured to simulate responses to the redirected traffic. This simulation maintains engagement with the attackers without revealing the decoy nature of the sub-application.

In some arrangements, the method includes generating synthetic data mimicking real user data for use in the sub-application. This synthetic data obfuscates the interaction environment from the attackers and enhances the realism of threat engagement.

In some arrangements, the synthetic data is varied periodically based on evolving external threat indicators. This variation maintains the efficacy of the sub-application in deceiving attackers.

In some arrangements, the method includes integrating feedback from the continuous monitoring into a reinforcement learning model within the large language model. This integration adaptively improves the predictive accuracy and response strategies of the large language model over time.

In some arrangements, a system for enhancing cybersecurity in digital applications is utilized. This system comprises a plurality of anomaly review agents deployed on application servers, each configured with advanced algorithms to monitor network traffic and user interactions within a primary application for potential security threats, using real-time analysis of patterns based on a comprehensive database of known cybersecurity risks and anomalies. The system also includes an integrated large language model, coupled with the anomaly review agents, designed to perform deep analytical processing on the detected traffic and user interactions, using advanced machine learning techniques to identify complex patterns indicative of security threats and to comprehensively assess the nature, severity, and potential impact of these threats on the primary application's operational integrity. Additionally, a generative design component is included, employing artificial intelligence to dynamically generate a detailed real-time architectural plan for a restricted-functionality sub-application, based on the insights derived from the large language model's analysis. This sub-application is configured to simulate engagement with detected threats, operating without access to any production data or operational functionalities of the primary application. The system features a dedicated separate infrastructure that hosts the restricted-functionality sub-application, implemented using cutting-edge software-defined networking techniques to ensure complete isolation from the primary application. This setup guarantees that interactions within the restricted-functionality sub-application do not impact the primary application's operations or compromise data integrity. Sophisticated traffic redirection mechanisms, equipped with intelligent filtering capabilities, are also included and are designed to selectively redirect traffic identified as potentially malicious from the primary application to the restricted-functionality sub-application, based on a multi-factor analysis of the severity and nature of the detected threats. Finally, comprehensive monitoring components continuously observe interactions within the restricted-functionality sub-application, equipped with state-of-the-art data collection tools that gather extensive data on the strategies and behaviors of malicious entities. This data is analyzed using analytical models to significantly enhance the threat detection and response capabilities of the large language model.

In some arrangements, the large language model is further enhanced with a pre-integration module that incorporates a vast repository of historical security data and threat intelligence reports before its deployment. This module facilitates a significantly enriched contextual basis for more precise and rapid threat detection.

In some arrangements, the generative design component includes a dynamic parameter customization module capable of instantaneously altering operational parameters and security configurations of the restricted-functionality sub-application based on real-time updates in the threat landscape. This module enables more tailored and effective engagement strategies for neutralizing threats.

In some arrangements, the separate infrastructure includes comprehensive network configuration management tools. These tools dynamically adjust specific network settings tailored to the evolving operational needs and security requirements of the restricted-functionality sub-application, optimizing network performance, and enhancing security measures to handle varying volumes and types of redirected malicious traffic efficiently.

In some arrangements, the system integrates a proactive firewall management module that uses advanced algorithms to programmatically update firewall rules and security protocols. This module is based on the continuous analysis of data collected from interactions within the restricted-functionality sub-application, thereby preemptively fortifying the network defenses of the primary application against potential future attacks that mimic previously identified threats.

In some arrangements, the traffic redirection mechanisms include a selective traffic control module that utilizes advanced pattern recognition and machine learning algorithms. This module filters and redirects only those parts of network traffic that display strong correlations with security threat profiles identified by the large language model, thus optimizing traffic management and enhancing the efficiency of threat mitigation.

In some arrangements, the restricted-functionality sub-application is augmented with a high-fidelity simulation engine. This engine is designed to accurately maintain prolonged engagement with attackers by mimicking responses indistinguishable from those of the primary application, strategically designed to not reveal the decoy nature of the sub-application while providing valuable intelligence on attacker behaviors.

In some arrangements, the restricted-functionality sub-application additionally incorporates a sophisticated synthetic data generator. This generator creates and deploys highly convincing synthetic data mimicking real user data in both structure and behavior, thereby significantly enhancing the realism of the threat engagement simulations conducted within the controlled decoy environment.

In some arrangements, the monitoring components include an advanced adaptive learning module. This module integrates comprehensive feedback from the continuous monitoring activities into the large language model's reinforcement learning algorithms, thereby facilitating the adaptive enhancement of the model's predictive accuracy and strategic response capabilities based on an ongoing analysis of real-world engagement outcomes and the evolving landscape of cybersecurity threats.

The following description and claims, in conjunction with the drawings—all integral parts of this specification—will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

BRIEF DESCRIPTION OF DRAWINGS

FIG. 1 illustrates a real-time application setup where application servers that handle live production traffic are equipped with anomaly review agents. These agents monitor for irregular patterns and signal if circuit breakers are frequently triggered for the same APIs, while injection monitors on these servers provide input to a large language model about the type of suspected issues, irregular traffic, and excessive API load.

DETAILED DESCRIPTION

Figure 2:
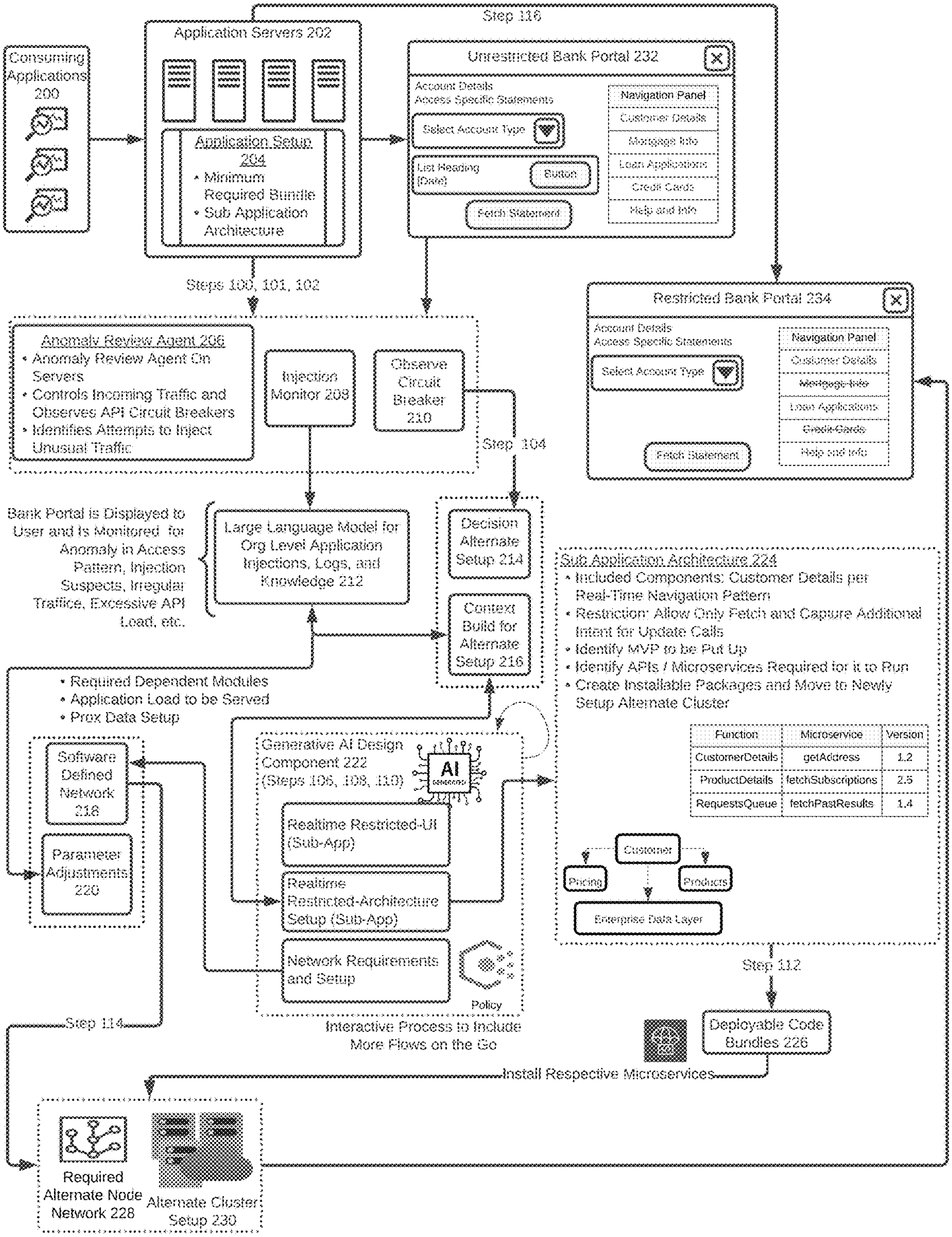
FIG. 2 shows a more detailed representation of the application architecture and flow, emphasizing the real-time engagement and monitoring processes, and the integration of software-defined networking to manage and isolate the decoy application environment.

By way of a high-level overview, the disclosed invention (s) provide a sophisticated approach to enhancing cybersecurity and operational resilience within digital environments. This system is primarily designed to safeguard primary applications from injection attacks by creating a parallel, restricted-functionality sub-application that runs in real-time with non-production data.

One aspect of the invention provides a capability to dynamically generate a decoy application using generative design principles, informed by a large language model. This model processes and analyzes traffic and user interactions in real-time to detect anomalies and potential security threats. Upon detection, the system uses the insights gained to architect and deploy a decoy sub-application specifically designed to engage and contain the threat, thus protecting the primary application from direct attacks.

Key to the functionality of the system is its use of artificial intelligence, particularly the implementation of a large language model, which allows for real-time decision-making and adaptive response strategies. This AI component assesses the nature and severity of incoming threats, enabling the system to tailor the sub-application's architecture and functionalities to effectively neutralize potential attacks without exposing sensitive data or relevant operational components.

Another innovative aspect of the invention is the seamless integration of software-defined networking, which supports the isolated operation of the decoy application. This ensures that interactions within this controlled environment do not impact the main application's performance or compromise its security.

The system also includes traffic redirection mechanisms that redirect potentially malicious queries from the primary application to the decoy. This not only preserves the integrity and availability of the primary application but also enables detailed monitoring and analysis of attack patterns, which can be used to enhance future security measures.

The system's design is inherently flexible and scalable, making it suitable for various organizational sizes and types. It can be integrated into different IT infrastructures with minimal disruption, offering a robust solution for businesses seeking to enhance their cybersecurity measures without compromising on operational efficiency.

This invention provides a proactive, intelligent, and scalable solution to modern cybersecurity challenges, leveraging cutting-edge technologies in AI and network design to protect relevant digital resources while maintaining uninterrupted service delivery and enhancing the understanding of security threats in real-time.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

Terms such as "computers," "machines," and similar phrases are used interchangeably based on the context to denote devices that may be general-purpose or specialized for specific functions, whether virtual or physical, and capable of network connectivity. This encompasses all pertinent hardware, software, and components known to those skilled in the field. Such devices might feature specialized circuits like application-specific integrated circuits (ASICs), microprocessors, cores, or other processing units for executing, accessing, controlling, or implementing various types of software, instructions, data, modules, processes, or routines. The employment of these terms within this document is not intended to restrict or exclusively refer to any specific type of electronic devices or components and should be interpreted broadly by those with relevant expertise. For conciseness and assuming familiarity, detailed descriptions of computer/software components and machines are omitted.

Software, executable code, data, modules, procedures, and similar entities may reside on tangible, physical computer-readable storage devices. This includes a range from local memory to network-attached storage, and various other accessible memory types, whether removable, remote, cloud-based, or accessible through other means. These elements can be stored in both volatile and non-volatile memory forms and may operate under different conditions such as autonomously, on-demand, as per a preset schedule, spontaneously, proactively, or in response to certain triggers. They may be consolidated or distributed across multiple computers or devices, integrating their memory and other components. These elements can also be located or dispersed across network-accessible storage systems, within distributed databases, big data infrastructures, blockchains, or distributed ledger technologies, whether collectively or in distributed configurations.

The term "networks" and similar references encompass a wide array of communication systems, including local area networks (LANs), wide area networks (WANs), the Internet, cloud-based networks, and both wired and wireless configurations. This category also covers specialized networks such as digital subscriber line (DSL) networks, frame relay networks, asynchronous transfer mode (ATM) networks, and virtual private networks (VPN), which may be interconnected in various configurations. Networks are equipped with specific interfaces to facilitate diverse types of communications—internal, external, and administrative—and have the ability to assign virtual IP addresses (VIPs) as needed. Network architecture involves a suite of hardware and software components, including but not limited to access points, network adapters, buses, both wired and wireless ethernet adapters, firewalls, hubs, modems, routers, and switches, which may be situated within the network, on its edge, or externally. Software and executable instructions operate on these components to facilitate network functions. Moreover, networks support HTTPS and numerous other communication protocols, enabling them to handle packet-based data transmission and communications effectively.

As used herein, Generative Artificial Intelligence (AI) or the like refers to AI techniques that learn from a representation of training data and use it to generate new content similar to or inspired by existing data. Generated content may include human-like outputs such as natural language text, source code, images/videos, and audio samples. Generative AI solutions typically leverage open-source or vendor sourced (proprietary) models, and can be provisioned in many ways, including, but not limited to, Application Program Interfaces (APIs), websites, search engines, and chatbots. Most often, Generative AI solutions are powered by Large Language Models (LLMs) which were pre-trained on large datasets using deep learning with over 500 million parameters and reinforcement learning methods. Any usage of Generative AI and LLMs is preferably governed by an Enterprise AI Policy and an Enterprise Model Risk Policy.

Generative artificial intelligence models have been evolving rapidly, with various organizations developing their own versions. Sample generative AI models that can be used under various aspects of this disclosure include but are not limited to: (1) OpenAI GPT Models: (a) GPT-3: Known for its ability to generate human-like text, it's widely used in applications ranging from writing assistance to conversation. (b) GPT-4: An advanced version of the GPT series with improved language understanding and generation capabilities. (2) Meta (formerly Facebook) AI Models-Meta LLAMA (Language Model Meta AI): Designed to understand and generate human language, with a focus on diverse applications and efficiency. (3) Google AI Models: (a) BERT (Bidirectional Encoder Representations from Transformers): Primarily used for understanding the context of words in search queries. (b) T5 (Text-to-Text Transfer Transformer): A versatile model that converts all language problems into a text-to-text format. (4) DeepMind AI Models: (a) GPT-3.5: A model similar to GPT-3, but with further refinements and improvements. (b) AlphaFold: A specialized model for predicting protein structures, significant in biology and medicine. (5) NVIDIA AI Models-Megatron: A large, powerful transformer model designed for natural language processing tasks. (6) IBM AI Models-Watson: Known for its application in various fields for processing and analyzing large amounts of natural language data. (7) XLNet: An extension of the Transformer model, outperforming BERT in several benchmarks. (8) GROVER: Designed for detecting and generating news articles, useful in understanding media-related content. These models represent a range of applications and capabilities in generative AI. One or more of the foregoing may be used herein as desired. All are considered within the sphere and scope of this disclosure.

Generative AI and LLMs can be used in various parts of this disclosure performing one or more various tasks, as desired, including: (1) Natural Language Processing (NLP): This involves understanding, interpreting, and generating human language. (2) Data Analysis and Insight Generation: Including trend analysis, pattern recognition, and generating predictions and forecasts based on historical data. (3) Information Retrieval and Storage: Efficiently managing and accessing large data sets. (4) Software Development Lifecycle: Encompassing programming, application development, deployment, along with code testing and debugging. (5) Real-Time Processing: Handling tasks that require immediate processing and response. (6) Context-Sensitive Translations and Analysis: Providing accurate translations and analyses that consider the context of the situation. (7) Complex Query Handling: Utilizing chatbots and other tools to respond to intricate queries. (8) Data Management: Processing, searching, retrieving, and using large quantities of information effectively. (9) Data Classification: Categorizing and classifying data for better organization and analysis. (10) Feedback Learning: Processes whereby AI/LLMs improve performance based on feedback it receives. (Key aspects can include, for example, human feedback, Reinforcement Learning, interactive learning, iterative improvement, adaptation, etc.). (11) Context Determination: Identifying the relevant context in various scenarios. (12) Writing Assistance: Offering help in composing human-like text for various forms of writing. (13) Language Analysis: Analyzing language structures and semantics. (14) Comprehensive Search Capabilities: Performing detailed and extensive searches across vast data sets. (15) Question Answering: Providing accurate answers to user queries. (16) Sentiment Analysis: Analyzing and interpreting emotions or opinions from text. (17) Decision-Making Support: Providing insights that aid in making informed decisions. (18) Information Summarization: Condensing information into concise summaries. (19) Creative Content Generation: Producing original and imaginative content. (20) Language Translation: Converting text or speech from one language to another.

By way of non-limiting disclosure, the flow diagram depicted in FIG. 1 shows a sophisticated cybersecurity system engineered to dynamically handle potential security threats within application environments, specifically focusing on the operational continuity of applications during such threats. This system utilizes advanced anomaly detection and generative design technology to create a decoy or parallel application that engages threats without compromising the primary application's functionality or data integrity.

The process initiates at Step 100, where the system begins with the identification of an alternate application requirement context. This is accomplished using a large language model (LLM) that integrates organizational level application injection knowledge. This model is pivotal as it aids in understanding the threat at a granular level, enabling precise and effective responses. Additionally, a software-defined network is set up to support an alternate infrastructure cluster that can host identified minimum viable product (MVP) APIs, microservices, and functional flows. This setup is relevant as it lays the groundwork for deploying a secure and isolated environment that can handle potential security threats without impacting the primary infrastructure.

At Step 101, application servers actively serving live production traffic have anomaly review agents. These agents are tasked with monitoring traffic for irregular patterns and are designed to raise indicators if circuit breakers are frequently triggered for the same APIs. This early detection is relevant as it allows for immediate action to mitigate potential threats before they can cause significant disruption.

In Step 102, injection monitors on the application servers play a relevant role. These monitors gather detailed knowledge about potential injection types, irregular traffic patterns, and excessive API load, and feed this information to the LLM. The data provided by these monitors enables the system to better understand the tactics and techniques used by attackers, enhancing the system's overall responsiveness and intelligence.

Following the initial detection and information gathering, Step 104 involves a relevant decision-making process where a decision is taken to establish an alternate application setup if the threat assessment warrants such action. The MVP architecture for this setup is identified, initiating a generative design process that tailors the architecture to the specific needs of the situation.

In the cybersecurity architecture detailed in FIG. 2 below, the decision alternatives setup (214) and context build for alternate setup (216) are pivotal processes that follow the initial anomaly detection and analysis conducted by the Large Language Model (LLM) (212) in Step 104. These components play roles in shaping the responsive actions of the system to potential threats identified by the LLM.

The decision alternatives setup (214) involves evaluating different strategies to address and mitigate detected security threats. This step is relevant because it determines the most effective response based on the threat as analyzed by the LLM. For instance, if the LLM identifies a sophisticated injection attack targeting the bank portal, the decision alternatives setup would evaluate various response strategies such as activating a restricted version of the application, updating firewall rules, or isolating the affected part of the network. The aim is to select a response that neutralizes the threat with minimal impact on the normal operations of the application and user experience. This decision-making process is supported by a framework that considers the potential consequences of each alternative, balancing security needs with operational continuity.

Following the decision on how to respond, the context build for alternate setup (216) takes place. This step involves preparing the operational and technical context for the chosen alternative setup. If the decision involves activating a restricted version of the application, for example, the context build for alternate setup would entail configuring the parameters to deploy this version. This includes setting up the appropriate environment, ensuring that all dependencies and resources are correctly aligned, and that the restricted application mirrors the functionalities of the main application to engage the attacker without exposing any real data or relevant operations.

The context build is relevant because it ensures that the alternate setup is ready to be deployed rapidly and effectively, with all necessary safeguards and functionalities in place. It encompasses detailed preparations such as provisioning the required services, adjusting configurations to suit the threat response, and deploying monitoring tools to track the effectiveness of the alternate setup. This preparation is tailored to the specific nature of the threat and the chosen response strategy, ensuring that the system's response is not only swift but also precisely targeted to mitigate the threat with maximum efficiency.

Together, these steps form a comprehensive approach to managing cybersecurity threats. They allow the system to dynamically adjust its defenses based on intelligent analysis and strategic decision-making, ensuring robust protection against evolving cyber threats while maintaining the integrity and availability of relevant business applications.

At Step 106, the generative design component of the system uses insights from the LLM to prepare a restricted application architecture. This architecture identifies the required dependent modules for accessed functionalities, ensuring that the alternate application can perform necessary functions while keeping sensitive operations and data isolated.

Step 108 further develops this architecture by designing screens for the identified functionalities with restricted features. Additionally, proxy data setups are created to populate these functionalities, allowing the system to engage potential threats in a controlled manner that mimics real operations without risking actual data or system integrity.

In Step 110, the system meticulously lists the network requirements to support the identified functions and the overall architecture. This step ensures that the network can handle the load and security requirements of the alternate setup with no compromises.

Step 112 sees the creation of an installable package containing the MVP APIs and microservices derived from the designed sub-application architecture. This package is relevant for the physical deployment of the alternate application, containing all software components necessary for its operation.

Step 114 involves the creation of a software-defined network tailored specifically to the requirements from Step 110. This network supports the deployment of the packages developed in Step 112 and ensures the operational and security isolation of the alternate application from the primary system.

Finally, in Step 116, the system routes marked malicious application calls to the newly deployed application, which now operates with restricted functionality and proxy data. This strategic redirection engages attackers with a decoy system, effectively occupying their efforts and preventing them from reaching the primary application. Simultaneously, it allows the system to analyze the attack patterns and tactics used, gathering valuable insights that enhance future security postures.

Building upon these insights, Step 118 involves building models with accurate knowledge patterns of the attacks. This enables creation of resilient applications that are better equipped to handle and repel future security threats. Through continuous adaptation and enhancement based on real attack data, the system not only defends against current threats but also evolves to anticipate and mitigate future vulnerabilities.

The representation of a sample flow in FIG. 1 showcases a robust cybersecurity system that not only proactively manages threats through intelligently orchestrated steps but also ensures that the primary application remains unaffected, maintaining optimal operational integrity and user experience.

By way of non-limiting disclosure, FIG. 2 presents a detailed depiction of a comprehensive cybersecurity architecture that leverages a real-time, restricted sub-application setup. This setup is designed to mitigate potential security threats without compromising the primary application's functionality or data. This flow diagram illustrates the interconnected components and their roles within a sophisticated system that employs advanced monitoring, artificial intelligence, and strategic isolation to enhance digital security.

The system begins with consuming applications (200), which are the user-facing end of the architecture, such as a bank portal (232). These applications are relevant touchpoints for users and are supported by robust application servers (202). The application servers handle live production traffic and have security measures to ensure they can detect and manage potential threats in real-time.

In Step 100, these servers are configured with a minimum required bundle and sub-application architecture (204), essential for maintaining operations while ensuring security. Anomaly review agents (206) are deployed on these servers to monitor incoming traffic and observe API circuit breakers (210). At a high level, these agents control the traffic flow and detect irregular patterns that may indicate a security threat, such as injection attempts or unusual access patterns.

Anomaly review agents (206) enable early detection and management of potential security threats within digital environments. These agents are software tools embedded within the application servers that continuously monitor network traffic and system activities to identify any deviations from normal operations that could indicate a security threat.

Functionality and Operation: Anomaly review agents are designed to analyze patterns of behavior within network traffic and application usage. They utilize a variety of detection techniques, including statistical analysis, machine learning models, and heuristic methods to identify anomalies. These anomalies might include unusual access patterns, unexpected request volumes, or atypical transactions that deviate from established norms.

The agents are configured to recognize specific types of behaviors known to be precursors or indicators of cyber threats, such as data breaches, unauthorized access, or denial of service attacks. For instance, a sudden surge in data traffic from a particular user could be flagged as potential data exfiltration, while repeated login attempts from an IP address might suggest a brute force attack attempt.

Integration with Other Systems: While anomaly review agents operate primarily at the server level, they are typically integrated with broader security management systems. This integration allows them to communicate detected anomalies to security information and event management (SIEM) systems, which aggregate and analyze data from various sources across the network. This data aggregation helps in correlating events across multiple vectors, enhancing the ability to detect sophisticated attacks that might not be obvious from a single point of observation.

Response Actions: Upon detecting an anomaly, these agents can initiate a variety of response actions depending on the configuration and the severity of the detected event. Responses might include sending alerts to administrators, triggering automated security protocols like temporarily blocking a user or IP address, or even integrating with response systems that can modify firewall rules to isolate affected network segments. In more advanced setups, anomaly review agents can also interact with other defensive mechanisms, such as intrusion detection systems (IDS) or intrusion prevention systems (IPS), to enhance the overall security posture.

Continuous Learning and Adaptation: Anomaly review agents often incorporate adaptive learning technologies that allow them to refine their detection algorithms based on new data. This capability is relevant in environments where threat vectors evolve rapidly, as it enables the agents to maintain efficacy. By continuously learning from new security incidents and integrating insights from across the security infrastructure, these agents can adapt their detection mechanisms to better identify and respond to emerging threats.

Injection monitors (208) complement the anomaly review agents by specifically analyzing the type and nature of traffic to identify potential injection attacks. Injection monitors (208) are specialized security components within the cybersecurity architecture, tasked with detecting and analyzing attempts to inject malicious code or data into an application. These monitors scrutinize the flow of incoming data to the servers for patterns or characters that could signify an injection attack, such as SQL injection, cross-site scripting (XSS), or code injection. These attacks typically involve the insertion of unauthorized commands or code into a vulnerable application to manipulate it into performing unauthorized operations, such as divulging sensitive information or granting access to restricted areas of a system.

The role of injection monitors is relevant because they serve as a targeted defense mechanism against one of the most common and damaging types of cybersecurity threats. They operate by examining incoming requests and analyzing the data fields for unusual or suspicious inputs that might indicate an attempt to exploit vulnerabilities in the application's data handling. This could include, for example, unexpected metacharacters or script tags that are commonly used in injection attacks to alter the normal execution flow of the application.

Injection monitors are integrated with the application servers where they continuously scan all incoming traffic. This integration allows them to provide real-time protection as they can immediately identify and mitigate potential injection attempts before they reach the application's back-end logic. Once an injection attempt is detected, the monitors can take several actions depending on the configuration and the security protocols in place. Common responses include blocking the offending request, alerting system administrators, logging the attempt for further analysis, and in more sophisticated systems, automatically updating security rules to prevent similar attacks in the future.

Injection monitors are often part of a broader security strategy that includes other defensive tools such as web application firewalls (WAFs) and regular code audits. With these tools, injection monitors enhance the application's resilience against attacks by not only preventing known types of injection attempts but also by helping to identify new vulnerabilities that could be targeted.

By providing a dedicated focus on detecting and responding to injection threats, injection monitors contribute significantly to maintaining the security and integrity of applications. They help ensure that applications can resist attacks that attempt to manipulate processing logic through malicious input, thereby safeguarding data and maintaining the trust of users.

This injection monitoring is detailed and targeted, providing relevant data that feeds into a large language model (212). This model, equipped for organizational level application injections, logs, and knowledge, processes the information to discern the context and severity of the detected anomalies, facilitating informed decision-making.

The Large Language Model for Organizational Level Application Injections, Logs, and Knowledge (212) is an advanced component of the cybersecurity architecture that plays a relevant role in analyzing and interpreting vast amounts of data related to application security. This AI-driven model leverages deep learning techniques to understand complex patterns and anomalies that could indicate potential security threats. It processes data collected from various sources within the organization, including logs of application activity, records of data injections, and other security-relevant information. By analyzing this data, the large language model helps in identifying subtle signs of malicious activity that might elude simpler detection systems.

This LLM model is adept at understanding the context of data and user interactions within the application, which enables it to distinguish between legitimate activities and potential threats. For example, it can analyze patterns of user behavior to detect anomalies that may suggest data theft or unauthorized access attempts. This capability is relevant for early detection of sophisticated attacks that do not trigger traditional security alarms, such as slowly escalating privileges or data exfiltration activities that occur over extended periods.

In the application's operation, the bank portal serves as the user interface where numerous transactions and interactions occur. This portal is displayed to users and is continuously monitored by the system for any anomalies in access patterns, injection suspects, irregular traffic, and excessive API load, among other indicators. Monitoring the bank portal involves scrutinizing every interaction that passes through the application's front end, where user inputs and system responses are closely observed for irregularities.

For instance, an anomaly in access patterns might be detected if a user repeatedly attempts to access data or functions that do not align with their usual behavior or permissions. Similarly, the system looks for signs of injection attacks where malicious scripts or SQL commands might be inserted into input fields to manipulate the application's operations or retrieve confidential information. Monitoring for irregular traffic involves analyzing the flow of data to and from the application to identify patterns that deviate from normal operation, such as unexpected spikes in data requests that could indicate a denial of service attack. Additionally, excessive API load monitoring helps in identifying potential abuse or misconfiguration of application interfaces, which could lead to performance degradation or security vulnerabilities.

Integrating the large language model with continuous monitoring of the bank portal ensures that any suspicious activity is quickly identified and assessed. By leveraging AI capabilities, the system can adapt its responses to evolving threats and refine its detection algorithms based on new data, thereby enhancing the overall security framework of the organization. This proactive approach not only helps in preventing security breaches but also minimizes potential disruptions to the application's operation, ensuring a secure and reliable user experience.

Step 104 initiates a decision-making process regarding the necessity of an alternate application setup. This is where the generative AI design component (222) comes into play, utilizing the data processed by the large language model to architect a secure, real-time restricted user interface (UI) and sub-application architecture (224). This architecture is designed to replicate necessary functionalities of the primary application in a controlled manner.

The generative AI design component (222) described in FIG. 2 represents an aspect of the cybersecurity system that is tasked with dynamically creating a restricted-functionality sub-application that responds in real-time to identified security threats. This component utilizes the power of artificial intelligence, particularly generative models, to architect and deploy a decoy version of the banking application that safely interacts with potential attackers, thereby safeguarding the primary application and its data.

The generative AI design component operates by integrating insights derived from the large language model (212) which processes data related to application injections, logs, and security incidents. By analyzing patterns and understanding detected threats, this AI component tailors the architecture of the sub-application to meet specific security requirements. This process involves selecting and configuring the essential elements that need to be replicated from the main application to create a believable yet controlled environment for engaging attackers.

In practical terms, the generative AI design component crafts a real-time restricted user interface (UI) and sub-application architecture that includes only those functionalities necessary to deceive potential attackers while preventing them from accessing or compromising real data. For instance, it might allow the restricted application to display certain types of customer information or perform limited transactional operations closely monitored and logged for security analysis.

The design process is highly adaptive, allowing for adjustments based on ongoing threat analysis and system feedback. It ensures that the restricted sub-application not only mimics the necessary aspects of the primary system to a degree necessary to engage malicious entities but also remains isolated in terms of data access and functionality. This isolation is relevant, as it prevents any risk to the production environment while allowing the security team to analyze the behavior and strategies of the attackers in a safe and controlled setting.

Additionally, the generative AI design component is responsible for identifying the minimum viable product (MVP) features that the decoy application needs to effectively function. It selects the APIs and microservices required to run these features, ensuring they are integrated into the deployable packages that will be installed on the alternate infrastructure. This step involves detailing the dependencies and ensuring that the architecture is robust enough to handle interactions without revealing its restricted nature to the attacker.

The generative AI design component (222) in FIG. 2 plays a relevant role in developing a sophisticated cybersecurity system designed to neutralize potential threats without compromising the main application's integrity. This component is responsible for creating three relevant aspects: a real-time restricted user interface for the sub-application, the architecture setup for this sub-application, and the specific network requirements and configurations to support it.

The real-time restricted user interface (UI) of the sub-application is engineered to safely interact with potential threats. This UI is crafted to appear normal to an unsuspecting attacker but is a controlled environment that limits what actions can be performed. It allows access to certain data or specific actions, which are closely monitored and logged, yet it restricts more sensitive transactions or views of data. Relevantly, any interaction through this UI does not affect the main application's operations or compromise real data, as it operates within a decoy setup that simulates normal application behavior.

Alongside the UI, the architecture of the sub-application is configured to support these restricted interactions without exposing real systems or data. This includes setting up necessary backend services, like databases and server applications, to provide limited functionality and data access consistent with the decoy environment's needs. This architecture is relevant for maintaining the illusion of a normal application environment while controlling the functionality available to the user. It is dynamically adjustable based on real-time analysis of user behavior and emerging threat patterns, ensuring the system remains secure as new threats are identified and engaged.

The network setup for the restricted sub-application is designed to support the decoy environment independently of the main application's network infrastructure. This involves creating a separate network segment isolated from the main network, preventing any potential crossover or leakage between the decoy and the primary environments. The network configuration includes robust monitoring and logging mechanisms to track all activity within the sub-application. This tracking analyzes the behavior of potential attackers and enables refinement of the system's security measures.

These elements of the generative AI design work in concert to ensure that the cybersecurity system can effectively engage potential threats in a realistic yet controlled manner. By dynamically generating a restricted UI and architectural setup and establishing a secure, isolated network, the system provides a robust defense mechanism. This setup allows security teams to monitor and analyze threat actions meticulously with no risk to the actual operational environment.

The generative AI design component (222) plays a pivotal role in the cybersecurity architecture by leveraging advanced AI capabilities to design, implement, and manage a secure, restricted sub-application. Its ability to dynamically generate protective measures in real-time allows for a sophisticated response to cyber threats, significantly enhancing the system's defensive capabilities while maintaining the integrity and performance of the primary application.

The sub-application architecture (224) maintains system security while managing interactions with potential cyber threats. This architecture is designed to handle sensitive user information and system interactions under stringent constraints, ensuring that the operational integrity and security of the primary application remain uncompromised.

The architecture specifically incorporates a component that displays customer details based on the user's real-time navigation patterns within the application. This dynamic adaptation ensures that only the necessary information relevant to the current user interaction is accessible, significantly reducing the risk of data exposure. By adjusting the visibility of sensitive information according to user behavior, the system enhances security while maintaining a responsive user experience.

The architecture can restrict user capabilities to fetching data and capturing the intent behind update calls. This means that while users can view or retrieve information, the system also logs any attempts to modify data, allowing for detailed monitoring of user activities. This dual functionality is relevant for security, as it not only allows the system to provide necessary data access but also helps in identifying and analyzing patterns that might indicate unauthorized or malicious attempts to alter data.

A relevant phase in establishing this architecture involves identifying the minimum viable product (MVP) that needs to be deployed. This MVP is the most pared-down version of the application that still includes all relevant functionalities required to effectively engage and analyze security threats. Determining the MVP involves a careful assessment of the application's core features to ensure that the deployed version can operate effectively within a restricted environment while being capable of handling potential security challenges.

The process also entails a thorough identification of all APIs and microservices that the MVP requires to function. These APIs and microservices facilitate the interactions and data exchanges within the application, allowing the restricted sub-application to operate as an integral yet isolated part of the cybersecurity infrastructure. Ensuring that the sub-application has access to the correct technical resources is relevant for maintaining functionality and security.

Once the necessary components and functionalities are defined, the subsequent action involves compiling these into deployable packages. These packages are comprehensive collections of software and data components essential for the installation and operation of the sub-application. After packaging, these are then moved to a newly established alternate cluster. This cluster is a specially configured isolated computing environment designed specifically to host the restricted sub-application with no connectivity to the primary application's infrastructure.

This isolated environment is relevant as it ensures that any engagement with potential threats through the sub-application does not impact the primary system. Operating the sub-application in a separate cluster not only safeguards the main application from direct exposure to threats but also allows for a controlled environment where threat behavior can be observed and analyzed with no risk to actual operational data or functionalities.

Through this detailed and structured approach, the architecture of the sub-application serves as a robust, interactive decoy that effectively engages potential attackers, allowing the system to analyze and respond to cyber threats in real-time while ensuring that the integrity and security of the primary application are maintained.

The restricted bank portal (234), as sample part of this architecture, includes navigation panels, customer details, mortgage info, loan applications, and credit cards but restricts specific actions to minimize risk, such as only allowing users to "Fetch Statement." The restricted bank portal (234) may remove certain functionality from the Unrestricted Bank Portal (232) such as "mortgage info" and "credit cards" other desired functionality links.

The unrestricted bank portal (232) illustrated in FIG. 2 serves as the primary user interface for the banking application, providing a full range of functionalities to users without the security constraints that characterize the restricted version. This portal is designed for everyday use, offering comprehensive access to a variety of banking services that facilitate user engagement with financial transactions and account management. In this environment, users can navigate freely through various services on the navigation panel, including accessing detailed customer information where they can view and edit personal and financial details.

Mortgage information is readily available, allowing users to review payment schedules, interest rates, and outstanding balances. Additionally, users can engage directly with financial services to apply for modifications to their mortgage terms. The portal also enables the submission of new loan applications and provides tools to track the status of existing loans. Users can interact with loan officers via the platform for further assistance or queries.

Credit card management is another key functionality, where users can manage their accounts by viewing statements, paying bills, and modifying security settings such as PINs. For additional support, the portal includes a Help and Info section that offers guidance on various banking operations, troubleshooting tips, and answers to frequently asked questions, enhancing the user's ability to manage their banking needs efficiently.

Unlike the restricted bank portal, which is tailored to secure interactions by limiting functionalities to mitigate cybersecurity risks, the unrestricted bank portal or the like operates under standard security protocols. These protocols are designed to be robust yet unobtrusive, maintaining a balance between security and user convenience. This approach ensures that users experience a seamless and secure banking environment that fosters confidence in their everyday financial transactions.

The design of this restricted bank portal or the like is structured to engage potential attackers in a decoy environment that mimics the real application but contains no real data or relevant functionality. This setup allows the system to analyze attack patterns and gather intelligence with no risk to the actual operations.

In Steps 106 and 108, the system prepares and lists the architectural and network requirements necessary for the alternate setup. This includes identifying MVP components, APIs, and microservices required to run the sub-application securely. These steps ensure that the architecture is robust enough to function independently of the primary application, engaging attackers exposing no sensitive or relevant infrastructure.

By Step 110, deployable code bundles (226) containing all necessary MVP APIs and microservices are created.

These bundles are relevant as they contain the software components essential for the deployment and functioning of the alternate environment.

In Step 112, these deployable packages are installed onto an alternate node network (228), which is part of a broader alternate cluster setup (230). This setup provides the necessary infrastructure to support the alternate application independently of the primary system, ensuring that any engagement with potential threats does not impact the primary application.

The software-defined network (218) supports this setup with parameter adjustments (220) made to accommodate required dependent modules, application loads, and proxy data setups. These adjustments maintain optimal performance and security of the restricted sub-application.

The entire system is designed to be flexible and adaptable, with an interactive process that allows for the inclusion of more flows on the go. This adaptability ensures that the system can dynamically respond to evolving threats by modifying existing functionalities or integrating new ones as needed.

Based on the output from the LLM model (212), the configuration of required dependent modules, management of application load, setup of proxy data, as well as the creation and adjustment of a software-defined network is provided. Each component plays a relevant role in creating a secure and functional decoy environment to engage potential cyber threats.

Required Dependent Modules: This refers to the specific software components and services that the sub-application depends on to function properly. These modules include various APIs, libraries, and backend services that need to be integrated into the sub-application to ensure it offers the intended functionalities while remaining isolated from the main application. The selection and integration of these modules are relevant for maintaining the functionality of the decoy application, allowing it to mimic the primary application closely enough to deceive attackers but without offering full access to sensitive operations or data.

Application Load to be Served: This aspect concerns the volume and type of transactions the sub-application is expected to handle. Planning for the application load involves understanding how much user interaction is anticipated, which impacts resource allocation such as computing power, memory, and storage. This ensures that the sub-application can perform efficiently under various scenarios, handling interactions without lag or downtime, which might alert attackers to its nature as a decoy. Effective load management helps maintain the performance of the sub-application, making it a credible replica of the main application from the perspective of an attacker.

Proxy Data Setup: Proxy data is used within the decoy environment to simulate real data interactions without exposing actual sensitive information. This setup involves creating datasets that look and feel like real operational data but are designed to engage attackers in a controlled manner. The proxy data must be convincing enough to keep the attackers engaged, providing them with responses that encourage further interaction, thereby revealing their strategies and techniques without risking real data compromise.

A Software Defined Network (218) isolates the restricted sub-application from the main network infrastructure. SDN technology allows network administrators to manage network services through abstraction of lower-level functionality. This is useful in cybersecurity contexts, where creating isolated environments or segmented networks can prevent potential breaches from spreading. In this setup, the SDN ensures that the sub-application's network traffic is separate from the main application, enhancing security by reducing the risk of cross-contamination.

Parameter Adjustments (220) involve fine-tuning the network and application settings to optimize performance and security based on the observed behavior of the system and potential threats. This includes configuring network gateways, firewalls, and access control lists to precisely control what data can enter and leave the decoy environment. Adjustments are made based on ongoing threat analysis and system performance data, allowing for dynamic responses to new information or changing attack patterns. These adjustments help maintain the efficacy and responsiveness of the decoy environment, ensuring that it remains a viable tool for engaging and analyzing cyber threats.

Together, these components and configurations form a comprehensive approach to managing a secure and effective decoy environment within a cybersecurity framework. By carefully orchestrating these elements, the system can convincingly replicate the primary application's functionality to engage attackers while ensuring the primary system's security and integrity remain intact.

To explain FIG. 2 somewhat differently, it can be understood to illustrate a sophisticated system designed to enhance the security and operational efficiency of digital applications, particularly within the realm of banking applications. This system utilizes generative design principles and advanced artificial intelligence techniques, specifically large language models, to dynamically manage and secure real-time application architectures. The focus is on creating a restricted sub-application setup that operates parallel to the main application but uses non-production data to ensure security without compromising the primary application's functionality.

Again, the need for such a system arises from the challenges faced in production environments where applications serve critical business functions. Traditional security measures in these environments often include a combination of anomaly detection, circuit breakers, and load management techniques. While effective in managing symptoms of problems, such as temporary overloads or specific security threats, these traditional methods do not address the underlying causes or the intent behind disruptive activities, particularly sophisticated security threats like injection attacks.

Injection attacks pose a significant challenge, as they involve unauthorized commands or data being inserted into a system, potentially leading to severe disruptions. The document discusses how current response strategies, which typically involve activating circuit breakers to cut off traffic to affected components, are reactive. Although these strategies contain the damage, they do not provide insights into the attackers' methods, leaving systems vulnerable to future incidents.

To overcome these limitations, the proposed system employs a combination of generative design and a large language model. This approach allows for the creation of a secondary, restricted-functionality application that runs in parallel to the primary application. The secondary application is designed to engage with and mitigate potential security risks without disrupting the primary application's operations.

At the core of the system is its ability to continuously monitor the primary application for signs of injection attacks or other irregular patterns that might indicate a security threat. Anomaly detection agents integrated within the application servers are responsible for this monitoring. These agents analyze traffic and interactions, looking for patterns that deviate from the norm, which could suggest potential security threats.

Upon detection of such anomalies, the system leverages its large language model to interpret the nature of the threat and to facilitate decision-making regarding the deployment of the secondary application. This AI-driven analysis allows the system to understand the context and specifics of the detected threat in real-time, enabling a tailored response to different types of security challenges.

The generative design component of the system then springs into action, utilizing the insights gained from the large language model to architect a secondary application. This sub-application is designed specifically to engage the potential threat without exposing any real or sensitive data. It mimics the functionality of the primary application to an extent necessary to deceive and engage the malicious entities, thereby protecting the integrity and security of the main application.

One of the innovative aspects of the invention is the real-time deployment of this secondary application. Once the generative design process defines the architecture and required components of the sub-application, an automated process creates and deploys this decoy application onto a designated infrastructure, isolated from the main operational environment. This ensures that any interaction with the decoy does not affect the primary application's performance or data integrity.

The system's deployment strategy includes setting up a software-defined network that facilitates the isolation and operation of the secondary application. This network is configured to handle the specific needs of the decoy environment, ensuring efficient operation without compromising the security or functionality of the primary network.

Traffic redirection mechanisms are another integral part of the invention. These mechanisms smartly redirect suspected malicious traffic from the primary application to the secondary application. This redirection is managed in such a way that attackers believe they are still interacting with the primary target, thus keeping them engaged without causing harm.

Throughout this process, the system can continuously monitor interactions with the secondary application to gather data on the attack strategies and tactics used by the attackers. This information is valuable for understanding the threats faced and for refining security measures. The insights gained can be used to enhance the AI models and generative design parameters, making the system more adept at responding to future threats.

Additionally, the flexibility and scalability of the system are key features. It is designed to adapt to various application environments and can be scaled according to the size and complexity of the infrastructure it protects. This makes it suitable for a wide range of industries and applications, from small businesses to large enterprises.

In summary, as shown in the sample of FIG. 2, the inventions disclosed herein not only protect digital applications from potential threats through a novel use of decoy environments but also enhance the understanding of cybersecurity threats in real-time. By doing so, it provides a robust tool for digital security management, significantly reducing the risk of data breaches and system downtime due to attacks, while ensuring that the primary application's performance remains unaffected. This dual capability of protection and performance management sets this system apart in cybersecurity solutions.

Figure 3:
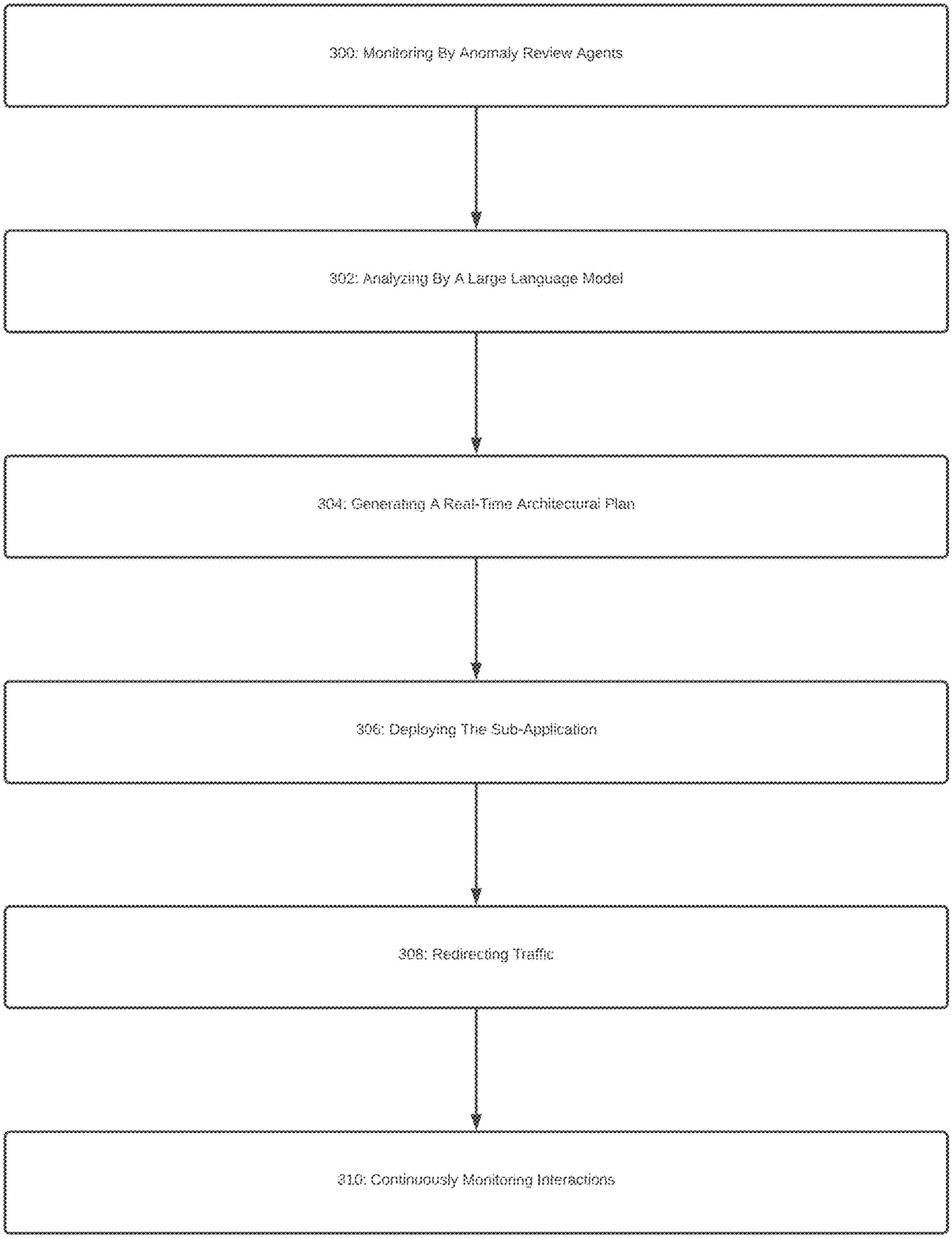
FIG. 3 outlines a process involving continuous monitoring by anomaly review agents, followed by analysis through a large language model. This leads to the generation of a real-time architectural plan, the deployment of the sub-application, traffic redirection, and ongoing interaction monitoring.

By way of non-limiting disclosure, FIG. 3 shows, at a high level, a method for enhancing cybersecurity in digital applications that represents a holistic and dynamic approach to threat detection, response, and the ongoing evolution of defense mechanisms. At its core lie several steps, each designed to fortify the digital ecosystem against a diverse array of potential security threats.

Step 300 initiates the process with the deployment of anomaly review agents, sophisticated software components strategically positioned on application servers. These agents serve as vigilant sentinels, continuously scrutinizing the traffic and user interactions within the primary application environment. Their algorithms are adept at detecting even the most subtle deviations from normal behavior, whether it be unusual access patterns, unexpected data flows, or suspicious user actions.

Upon detecting anomalies in Step 302, the anomaly review agents swiftly pass the collected data to a large language model (LLM) in Step 304. This LLM acts as the intelligence center of the operation, leveraging cutting-edge artificial intelligence and machine learning techniques to conduct a deep and nuanced analysis of the detected traffic and interactions. Its primary objective is to discern intricate patterns and subtle indicators that may indicate security threats lurking within the application environment.

Based on the rich insights provided by the LLM's analysis in Step 304, Step 306 engages the generative design component. This component harnesses the intelligence gleaned from the LLM's analysis to dynamically generate a real-time architectural plan for a restricted-functionality sub-application. This sub-application is purposefully engineered to confront and neutralize identified threats without the need to access production data. Through meticulous isolation from the primary infrastructure and deployment on a separate infrastructure using software-defined networking, Step 308 ensures that the integrity and operations of the primary application remain safeguarded while potential threats are engaged and monitored within a controlled environment.

In Step 310, traffic redirection mechanisms come into play. These mechanisms deftly redirect any suspicious traffic from the primary application to the sub-application, shielding the primary application from potential security breaches. This redirection not only acts as a protective barrier but also ensures that any identified threats are effectively contained and managed within the controlled confines of the sub-application's environment.

As interactions unfold within the sub-application, continuous monitoring persists in Step 310. This ongoing surveillance amasses a wealth of valuable data on the strategies and tactics employed by malicious entities. This invaluable intelligence is then fed back into the system, enriching the threat detection capabilities of the LLM. Through iterative analysis and adaptation to emerging threats, the system evolves into a proactive and resilient defense mechanism against cyber threats, ensuring the continued security of digital applications in an ever-evolving threat landscape.

Figure 4:
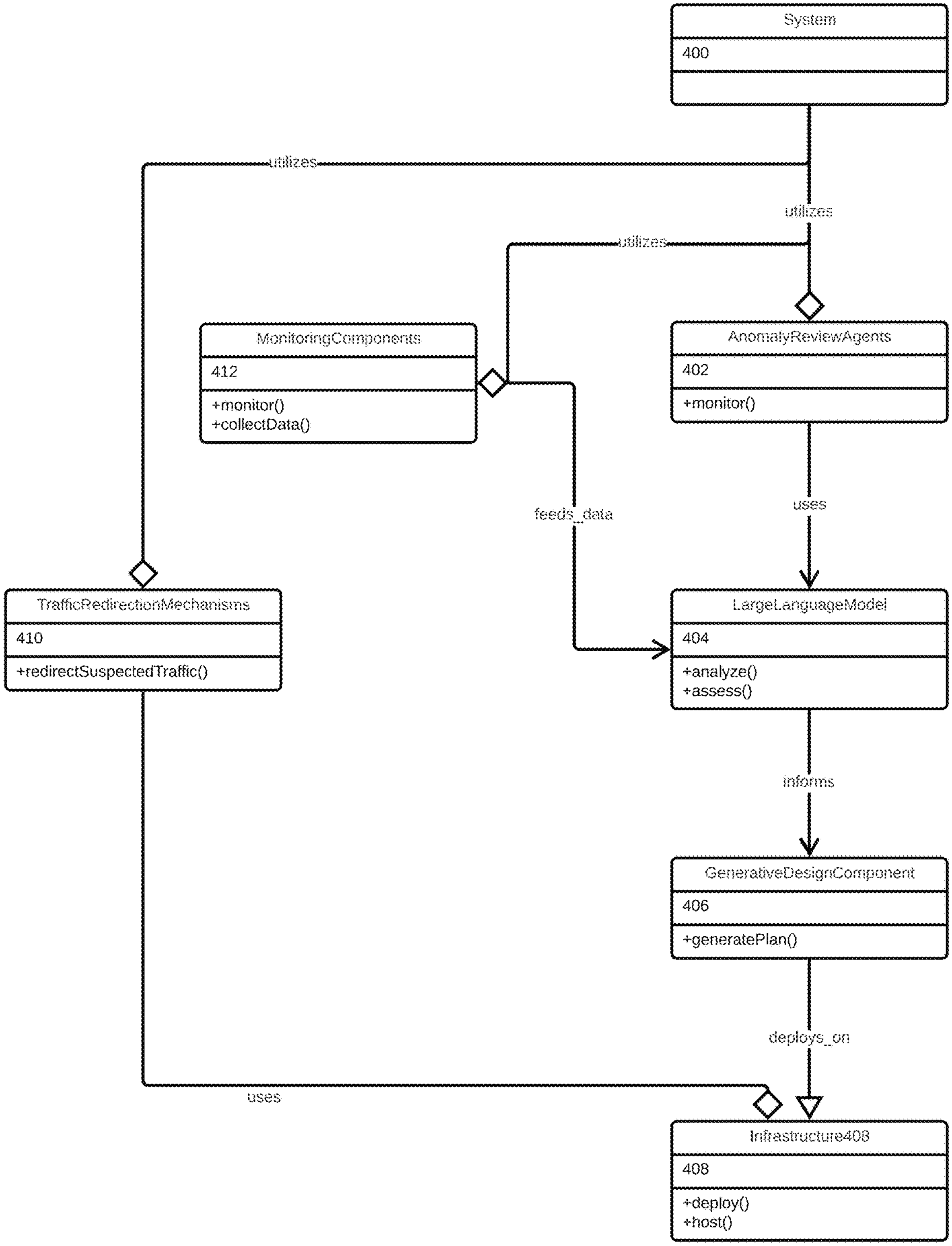
FIG. 4 presents a sample class diagram of a cybersecurity enhancement system, which integrates various specialized components including: Anomaly Review Agents, a Large Language Model, a Generative Design Component, dedicated Infrastructure, Traffic Redirection Mechanisms, and Monitoring Components, each interconnected to dynamically detect, analyze, and mitigate potential cyber threats within digital applications.

By way of non-limiting disclosure, the sample class diagram of FIG. 4 outlines the structure and interaction of an example system (400) to enhance cybersecurity in digital applications. This system is an intricate assembly of specialized components, each crafted to address specific challenges in the realm of digital security by working in a synergistic manner. The classes and their relationships in the diagram not only highlight the functionality of each component but also illustrate the flow of data and control across the system, underscoring the depth of integration and coordination required for effective cybersecurity management.

Starting with the Anomaly Review Agents (Class 402), these agents are strategically deployed on application servers where they serve as the first line of defense against potential cyber threats. Equipped with the monitor( ) function, these agents relentlessly scan network traffic and user interactions within the primary application. They utilize sophisticated algorithms capable of real-time analysis, leveraging a vast database of cybersecurity risks and anomalies. This enables them to detect unusual patterns and potential security threats early in their inception, thereby providing critical data for further analysis.

The core analytical capabilities of System 400 are embodied in the Large Language Model (Class 404), which is seamlessly integrated with the Anomaly Review Agents. This model enhances the system's analytical depth with two essential functions: analyze( ) and assess( ). Through the analyze( ) function, the Large Language Model processes the data flagged by the Anomaly Review Agents. It employs cutting-edge machine learning techniques to dissect complex data patterns, identifying those that could signify sophisticated security threats. The assess( ) function complements this by evaluating the identified threats to understand their nature, severity, and potential impact on the primary application's operational integrity. This assessment is crucial for prioritizing responses and allocating resources effectively to counter the most significant threats.

Adjacent to this analytical duo is the Generative Design Component (Class 406), which harnesses the intelligence provided by the Large Language Model. It features the generatePlan( ) function, a pivotal capability that uses artificial intelligence to dynamically generate a real-time architectural plan for a restricted-functionality sub-application. This sub-application is ingeniously designed to simulate engagements with detected threats securely, operating in a sandbox environment that isolates it from the primary application's critical operational functionalities and production data.

Infrastructure (Class 408) is tailored to support the deployment and operation of the restricted-functionality sub-application. This infrastructure is built using advanced software-defined networking techniques, which ensure a robust separation between the sub-application and the primary application. Such isolation is vital for preventing any adverse impact on the primary application's operations or data integrity, regardless of the activities within the sub-application.

Traffic Redirection Mechanisms (Class 410) have the redirectSuspectedTraffic( ) function, designed to manage and safeguard the flow of data between the primary application and the sub-application. These mechanisms analyze network traffic in real-time and intelligently redirect traffic deemed potentially malicious based on a thorough multi-factor analysis. This not only protects the primary application from direct exposure to threats but also ensures that potential threats are engaged and analyzed within the controlled environment of the sub-application.

Finally, the Monitoring Components (Class 412) are integral to the ongoing evaluation and adaptation of the system. Through functions like monitor( ) and collectData( ), these components undertake continuous surveillance of interactions within the sub-application. They gather detailed and actionable data on the strategies and behaviors of malicious entities. This wealth of data feeds into analytical models that refine and enhance the threat detection and response capabilities of the Large Language Model, facilitating a proactive and adaptive security posture.

Figure 5:
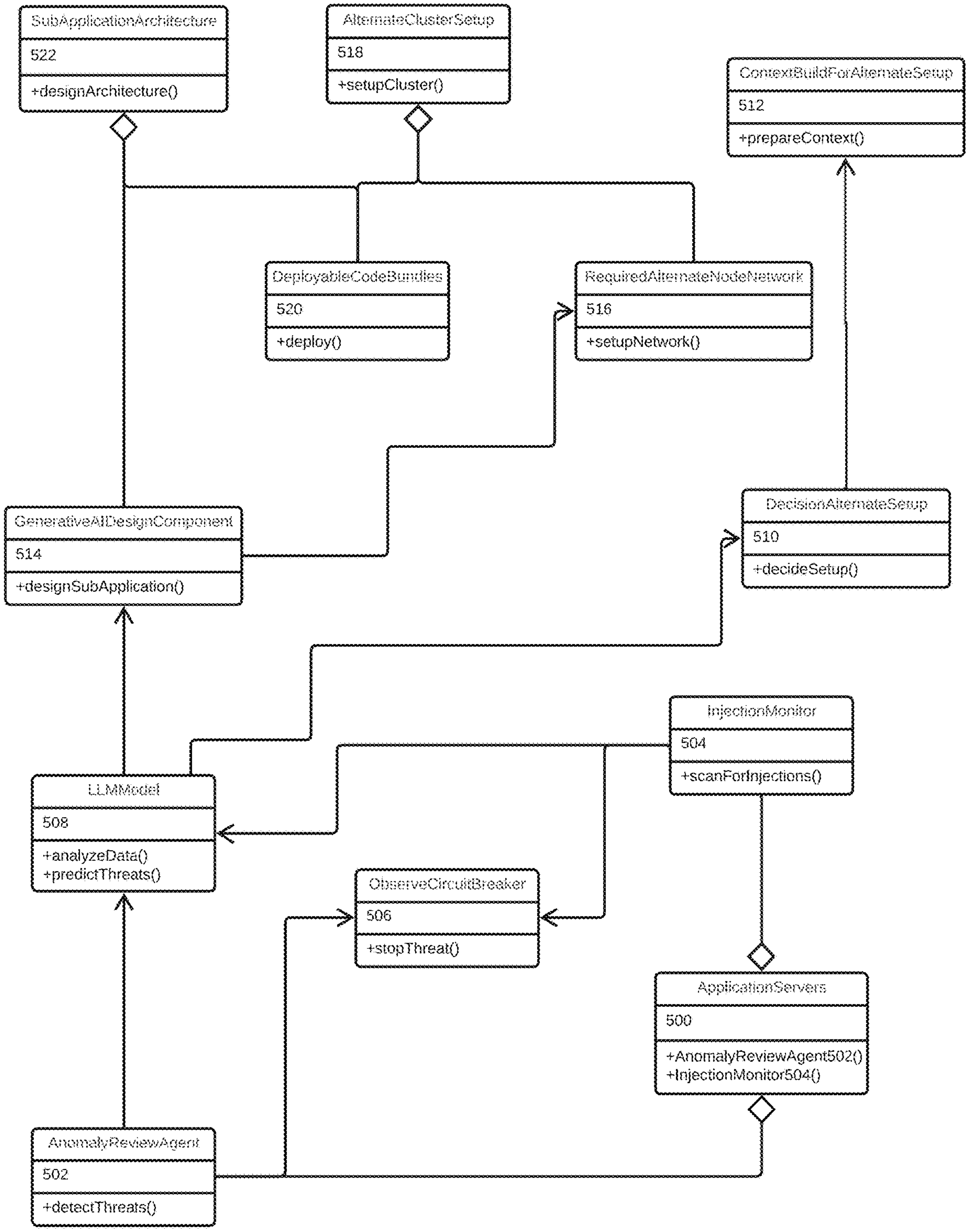
FIG. 5 is another class diagram for components an exemplary complex cybersecurity system designed to enhance security measures within digital applications. Each component plays a specific role and is interconnected to effectively detect, respond to, and mitigate potential cyber threats.

FIG. 5 is another class diagram for sample components in an exemplary complex cybersecurity system designed to enhance security measures within digital applications. Each component plays a specific role and is interconnected to effectively detect, respond to, and mitigate potential cyber threats.

Application Servers (Class 500)—These are the platforms where applications operate. They host both the primary application and various security components like the Anomaly Review Agent and Injection Monitor.

Anomaly Review Agent (Class 502)—Deployed on the application servers, this agent monitors traffic and user interactions to detect irregular patterns that may indicate a security threat. Its primary role is to flag these anomalies for further analysis.

Injection Monitor (Class 504)—Also on the application servers, this component specifically looks for signs of injection attacks, such as SQL injections or cross-site scripting, which are common tactics used to breach security. It works alongside the Anomaly Review Agent by providing specialized monitoring for these threats.

Observe Circuit Breaker (Class 506)—This component acts as a safety mechanism to stop potentially harmful interactions once an anomaly or threat is detected by the Anomaly Review Agent or the Injection Monitor. It helps prevent system overloads and compromise by "breaking" the circuit of malicious activities.

LLM Model for Org Level Application Injections, Logs, and Knowledge (Class 508)—This Large Language Model analyzes data collected by the Anomaly Review Agent and Injection Monitor. It processes this information to understand the context and severity of the threats, leveraging historical data, and logged incidents to enhance its predictive capabilities.

Decision Alternate Setup (Class 510)—This decision-making process is triggered by the findings from the LLM. Based on the analysis, if a threat warrants a more robust response, this component decides to initiate an alternate setup for handling the threat outside the primary operational environment.

Context Build for Alternate Setup (Class 512)—Following the decision to implement an alternate setup, this component prepares the necessary technical and operational context. It sets the stage for deploying a secondary, restricted-functionality application specifically designed to handle or contain the threat.

Generative AI Design Component (Class 514)—This AI-powered component uses the insights from the LLM to design a real-time, restricted sub-application. It includes setting up a restricted user interface, restricted application architecture, and the necessary network configurations to ensure the sub-application operates effectively and securely.

Required Alternate Node Network (Class 516)—This network setup provides the necessary infrastructure for the alternate sub-application. It ensures that the sub-application is isolated from the primary network, minimizing potential disruptions or further security breaches.

Alternate Cluster Setup (Class 518)—The entire infrastructure setup where the alternate node network and the deployable sub-application reside. This cluster is separate from the main operational environment, providing a controlled area where threats can be analyzed and contained without risking the primary application's integrity.

Deployable Code Bundles (Class 520)—These are packages of software components that include everything needed for the sub-application to function. They are deployed within the alternate cluster setup and are integral to the sub-application's operation.

Sub Application Architecture (Class 522)—This refers to the specific architectural setup of the sub-application within the alternate cluster. It is designed to mimic necessary functionalities of the primary application but in a controlled and restricted manner to engage threats safely.

Figure 6:
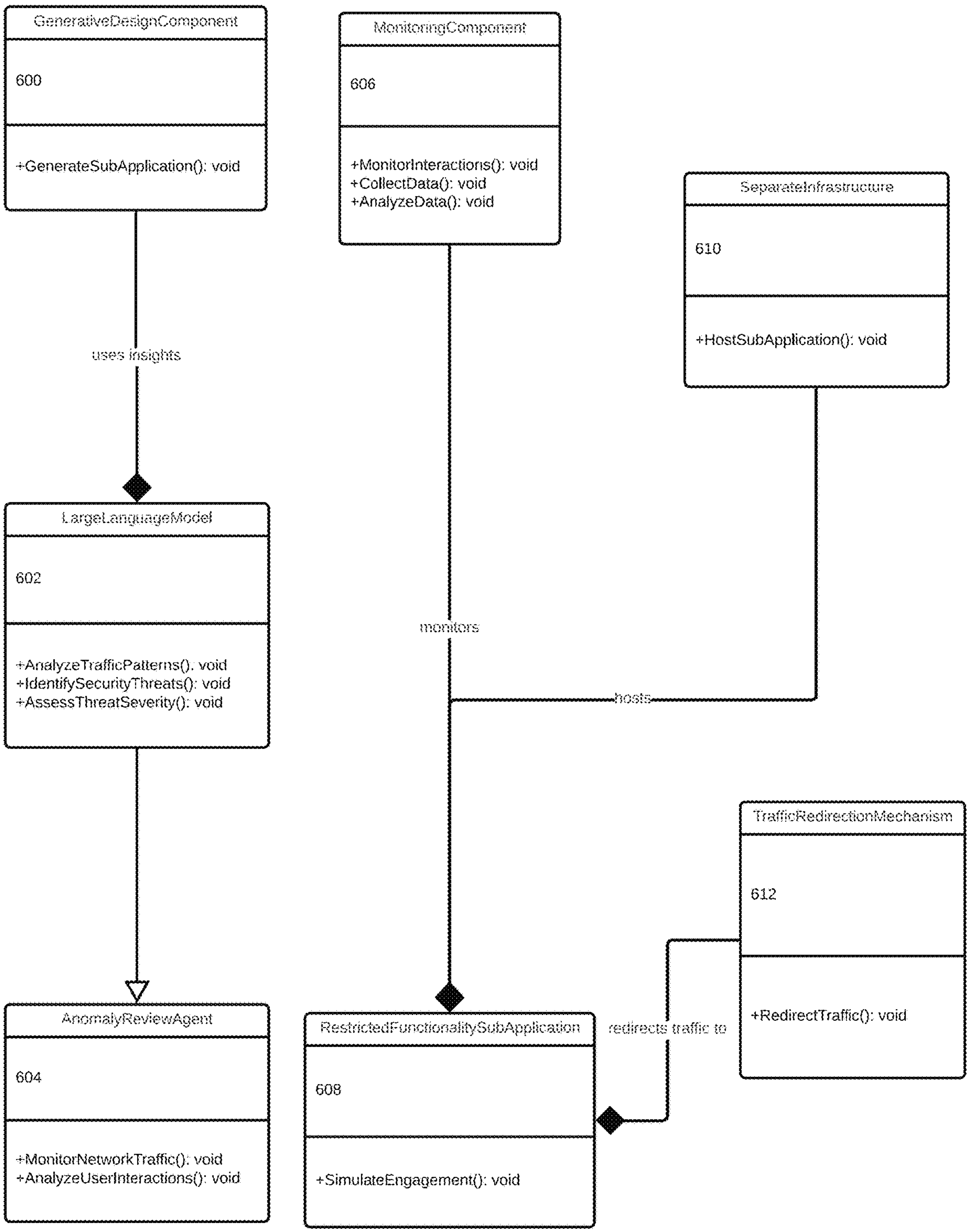
FIG. 6 presents a further class diagram detailing the architecture of a cybersecurity enhancement system, designed to monitor, analyze, and respond to potential threats in digital applications.

FIG. 6 presents another sophisticated and layered class diagram detailing the components of a cybersecurity enhancement system designed to protect digital applications from various security threats. This diagram meticulously maps out the functionalities and interdependencies of the system's key components, illustrating how they collaboratively work to detect, analyze, and mitigate potential cyber threats.

At the core of the system is the Generative Design Component (Class 600). This component is pivotal in employing artificial intelligence to dynamically generate a real-time architectural plan for a restricted-functionality sub-application. The function GenerateSubApplication( ): void encapsulated within this class is responsible for creating a sub-application that can simulate engagement with detected threats in a controlled environment, isolated from the primary application's critical operational functionalities and data.

Directly interacting with the Generative Design Component is the Large Language Model (Class 602). This model leverages advanced machine learning techniques to perform deep analytical processing on the data provided. It comprises functions such as Analyze TrafficPatterns( ): void, IdentifySecurityThreats( ): void, and AssessThreatSeverity( ): void, each designed to enhance the system's ability to understand and respond to potential security threats effectively. The Large Language Model uses insights from traffic patterns and user interactions analyzed by the Anomaly Review Agent to identify and assess the nature and severity of potential threats, providing a comprehensive evaluation that guides the generative design process.

The Anomaly Review Agent (Class 604) plays a critical role in the initial detection phase. With functions like MonitorNetworkTraffic( ): void and AnalyzeUserInteractions( ): void, it scans network traffic and user interactions to detect unusual activities that might indicate a security breach. These agents are deployed on application servers where they perform real-time analysis of patterns based on a comprehensive database of known cybersecurity risks and anomalies.

Once the threat is detected and an appropriate response is generated by the Generative Design Component, the Restricted-Functionality Sub-Application (Class 608) comes into play. This class, equipped with the function SimulateEngagement( ): void, executes the plans generated by the Generative Design Component to engage with the threats without risking the primary application's integrity. It operates within a Separate Infrastructure (Class 610), which hosts the sub-application. The infrastructure ensures complete isolation of the sub-application from the primary application, as indicated by the function HostSubApplication( ): void. This isolation is critical for maintaining the primary application's operational integrity and data security.

The Traffic Redirection Mechanism (Class 612) is integral to managing how traffic is handled once a threat is detected. With the function RedirectTraffic( ): void, this mechanism redirects suspected malicious traffic from the primary application to the restricted-functionality sub-application. This redirection is based on a multi-factor analysis of the severity and nature of the detected threats, ensuring that only potentially harmful traffic is redirected to be safely analyzed and mitigated.

Last, the Monitoring Component (Class 606) continuously oversees the interactions within the restricted-functionality sub-application. It is responsible for functions such as MonitorInteractions( ): void, CollectData( ): void, and AnalyzeData( ): void. These functions allow the system to gather and analyze extensive data on the strategies and behaviors of malicious entities. The collected data is then used to further refine the threat detection and response strategies, enhancing the system's overall cybersecurity capabilities.

The classes in this diagram are intricately connected, demonstrating the flow of data and control that enables the system to operate efficiently. These connections illustrate a robust architecture where real-time data analysis, proactive threat engagement, and continuous monitoring converge to form a highly effective cybersecurity defense mechanism. This detailed setup ensures that each component contributes to a comprehensive strategy to protect digital applications from sophisticated cyber threats.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for enhancing cybersecurity in digital applications, the method comprising the steps of:

deploying anomaly review agents on application servers, wherein the anomaly review agents are configured to monitor network traffic and user interactions within a primary application to actively detect potential security threats based on predefined patterns of known cybersecurity risks;

integrating a large language model with the anomaly review agents as deployed, wherein the large language model is employed to analyze the network traffic and the user interactions detected by the anomaly review agents to identify complex patterns indicative of security threats, and to assess a nature, severity, and potential impact of the security threats on integrity of the primary application by generating and deploying synthetic data that accurately mimics real user data in structure and behavior for use within the restricted-functionality sub-application;

employing a generative design component that dynamically generates a real-time architecture for a restricted-functionality sub-application based on analysis performed by the large language model, wherein the restricted-functionality sub-application is specifically configured to engage with detected threats through interaction simulations, without accessing or compromising any production data or operational functionalities of the primary application;

deploying the restricted-functionality sub-application on a dedicated, separate infrastructure that is isolated from the primary application using advanced software-defined networking techniques, ensuring that all interactions within the restricted-functionality sub-application are contained and do not impact operations or data integrity of the primary application;

employing traffic redirection mechanisms that are programmed to intelligently redirect traffic suspected of being malicious from the primary application to the restricted-functionality sub-application based on the severity and nature of the threat, thereby protecting the integrity of the primary application and simultaneously engaging the security threats within a controlled and monitored environment of the restricted-functionality sub-application; and continuously monitoring interactions within the restricted-functionality sub-application using data collection tools that gather detailed data on strategies and behaviors of malicious entities, wherein the detailed data is systematically analyzed to enhance threat detection and response capabilities of the large language model, facilitating ongoing improvements in threat response strategies and system resilience by integrating feedback from the continuous monitoring into a reinforcement learning model within the large language model.

2. The method of claim 1, wherein the large language model is further configured to be pre-initialized with a comprehensive database of historical security data and threat intelligence reports prior to analyzing the traffic and the user interactions as detected, thereby significantly enhancing accuracy and speed of threat detection by providing a richer contextual basis for analysis.

3. The method of claim 2, wherein the generative design component is additionally configured to customize operational parameters and security features of the restricted-functionality sub-application based on specific types of the detected threats, dynamically altering the operational parameters to tailor threat engagement strategies and neutralize the detected threats more effectively.

4. The method of claim 3, wherein deploying the restricted-functionality sub-application additionally involves configuring specific network settings tailored to operational needs and security requirements of the restricted-functionality sub-application, optimizing network performance and enhancing security measures based on an expected nature and volume of redirected malicious traffic.

5. The method of claim 4, further comprising the step of programmatically updating firewall rules and security protocols based on the detailed data collected from the continuous monitoring of interactions within the restricted-functionality sub-application, thereby preemptively strengthening network defenses of the primary application against similar future attacks.

6. The method of claim 5, wherein the traffic redirection mechanisms are further configured to selectively redirect only those parts of network traffic that exhibit patterns strongly associated with previously identified and analyzed threats, enhancing efficiency of traffic management and threat mitigation.

7. The method of claim 6, wherein the restricted-functionality sub-application is further enhanced with sophisticated simulation capabilities designed to maintain engagement with the attackers by mimicking responses that would be expected from the primary application, without revealing a decoy nature of the restricted-functionality sub-application.

8. The method of claim 7, further including the step of generating and deploying synthetic data that accurately mimics real user data in structure and behavior for use within the restricted-functionality sub-application, thereby further obfuscating a decoy environment from discerning attackers and enhancing realism of threat engagement simulations.

9. The method of claim 8, wherein the synthetic data is periodically varied and updated based on evolving external threat indicators and ongoing security analysis to maintain effectiveness of the restricted-functionality sub-application in deceiving attackers and gathering actionable intelligence.

10. The method of claim 9, further comprising the step of integrating feedback from the continuous monitoring into a reinforcement learning model within the large language model, wherein this integration facilitates adaptive improvement of predictive accuracy and response strategies over time for the large language model and response strategies, based on real-world engagement outcomes and evolving threat landscapes.

11. A system for enhancing cybersecurity in digital applications, comprising:

a processor and a memory, further comprising:

a plurality of anomaly review agents implemented as software executed on application servers, each configured with advanced algorithms to monitor network traffic and user interactions within a primary application for potential security threats, utilizing real-time analysis of patterns based on a comprehensive database of known cybersecurity risks and anomalies;

an integrated large language model, coupled with the anomaly review agents, designed to perform deep analytical processing on the traffic and user interactions detected, employing advanced machine learning techniques to identify complex patterns indicative of security threats, and to comprehensively assess a nature, severity, and potential impact of these threats on the primary application's operational integrity;

a generative design component implemented as artificial intelligence software that employs artificial intelligence to dynamically generate a detailed real-time architecture for a restricted-functionality sub-application, based on insights derived from analysis by the large language model, wherein this sub-application is configured to simulate engagement with detected threats, operating entirely without access to any production data or operational functionalities of the primary application by incorporating a sophisticated synthetic data generator that creates and deploys highly convincing synthetic data mimicking real user data in both structure and behavior;

a dedicated separate infrastructure implemented as a hosted computing environment that hosts the restricted-functionality sub-application, implemented using software-defined networking techniques to ensure complete isolation from the primary application, thereby guaranteeing that interactions within the restricted-functionality sub-application do not impact the primary application's operations or compromise data integrity;

traffic redirection mechanisms, implemented as software equipped with filtering capabilities, designed to selectively redirect traffic identified as potentially malicious from the primary application to the restricted-functionality sub-application, based on a multi-factor analysis of the severity and nature of the detected threats, thereby protecting the integrity of the primary application and engaging potential security threats within a rigorously controlled environment; and comprehensive monitoring components that continuously monitor interactions within the restricted-functionality sub-application, equipped with data collection tools that gather data on strategies and behaviors of malicious entities, wherein the data is analyzed using a series of analytical models to significantly enhance threat detection and response capabilities of the large language model by including an advanced adaptive learning module that integrates comprehensive feedback from the continuous monitoring activities into reinforcement learning algorithms for the large language model.

12. The system of claim 11, wherein the large language model is further enhanced with a pre-integration module that incorporates a repository of historical security data and threat intelligence reports prior to deployment, facilitating a enriched contextual basis for more precise and rapid threat detection.

13. The system of claim 12, wherein the generative design component includes a dynamic parameter customization module capable of instantaneously altering operational parameters and security configurations of the restricted-functionality sub-application based on real-time updates in a threat landscape, thereby enabling tailored and effective engagement strategies for neutralizing threats.

14. The system of claim 13, wherein the separate infrastructure includes network configuration management tools that dynamically adjust network settings tailored to evolving operational needs and security requirements of the restricted-functionality sub-application, optimizing network performance and enhancing security measures to handle varying volumes and types of redirected malicious traffic efficiently.

15. The system of claim 14, wherein the system further integrates a proactive firewall management module that uses advanced algorithms to programmatically update firewall rules and security protocols based on continuous analysis of the data collected from interactions within the restricted-functionality sub-application, thereby preemptively fortifying network defenses of the primary application against potential future attacks that mimic previously identified threats.

16. The system of claim 15, wherein the traffic redirection mechanisms include a selective traffic control module that utilizes advanced pattern recognition and machine learning algorithms to filter and redirect only those parts of network traffic that display strong correlations with security threat profiles identified by the large language model, thus optimizing traffic management and enhancing the efficiency of threat mitigation.

17. The system of claim 16, wherein the restricted-functionality sub-application is augmented with a high-fidelity simulation engine designed to accurately maintain prolonged engagement with attackers by mimicking responses that are indistinguishable from those of the primary application, strategically designed to not reveal a decoy nature of the sub-application while providing valuable intelligence on attacker behaviors.

18. The system of claim 17, wherein the restricted-functionality sub-application additionally incorporates a sophisticated synthetic data generator that creates and deploys highly convincing synthetic data mimicking real user data in both structure and behavior, thereby significantly enhancing realism of the threat engagement simulations conducted within a controlled decoy environment.

19. The system of claim 18, wherein the monitoring components include an advanced adaptive learning module that integrates comprehensive feedback from the continuous monitoring activities into reinforcement learning algorithms for the large language model, thereby facilitating adaptive enhancement of predictive accuracy and strategic response capabilities for the large language model based on an ongoing analysis of real-world engagement outcomes and an evolving landscape of cybersecurity threats.

20. A method for enhancing cybersecurity in digital applications, the method comprising the steps of:

monitoring, by anomaly review agents deployed on application servers, traffic and user interactions within a primary application to detect potential security threats;

analyzing, by a large language model integrated with said anomaly review agents, the traffic and the user interactions that were detected to identify patterns indicative of security threats and determining a nature and severity of the potential security threats;

generating, by a generative design component, a real-time architectural plan for a restricted-functionality sub-application based on analysis performed by the large language model, wherein the sub-application is configured to engage with detected threats without accessing production data by generating and deploying synthetic data that accurately mimics real user data in structure and behavior for use within the restricted-functionality sub-application;

deploying the restricted-functionality sub-application on a separate infrastructure isolated from the primary application using software-defined networking to ensure that interactions within the sub-application do not affect operations of the primary application;

redirecting, by traffic redirection mechanisms, traffic suspected of being malicious from the primary application to the sub-application to protect the integrity of the primary application and to engage the potential security threats within a controlled environment of the sub-application; and continuously monitoring interactions within the sub-application to collect data on attack strategies employed by malicious entities, wherein the data is used to enhance threat detection capabilities of the large language model by integrating feedback from the continuous monitoring into a reinforcement learning model within the large language model.

* * * * *